United States Patent [19]

Morris

[11] Patent Number: 5,020,090
[45] Date of Patent: May 28, 1991

[54] APPARATUS FOR REMOVABLY CONNECTING A CELLULAR PORTABLE TELEPHONE TO A COMPUTER

[75] Inventor: Walker C. Morris, Dallas, Tex.

[73] Assignee: Intelligence Technology Corporation, Dallas, Tex.

[21] Appl. No.: 434,934

[22] Filed: Nov. 13, 1989

[51] Int. Cl.$^5$ .............................................. H04M 11/00
[52] U.S. Cl. ...................................... 379/58; 379/56; 379/96
[58] Field of Search ...................... 379/56, 61, 62, 63, 379/200, 354, 355, 368, 428, 443, 444, 434, 440, 59, 96, 58, 96, 100; 455/89, 90; D14/137, 138; 364/708, 705.05, 705.06, 705.04

[56] References Cited

U.S. PATENT DOCUMENTS

| | | | |
|---|---|---|---|
| 4,654,867 | 3/1987 | Labez | 379/59 |
| 4,849,815 | 7/1989 | Streck | 379/100 |
| 4,856,045 | 8/1989 | Hoshina | 379/53 |
| 4,864,601 | 9/1989 | Berry | 279/96 |

OTHER PUBLICATIONS

Inforworld, Jul. 2, 1984 pp. 11-12.

*Primary Examiner*—Jin F. Ng
*Assistant Examiner*—William Cumming
*Attorney, Agent, or Firm*—Timmons & Kelly

[57] ABSTRACT

Apparatus for removably connecting a cellular portable telephone to a laptop or portable computer is disclosed and comprises a track formed in the housing of the computer and is structured to slidably receive a cellular portable telephone whose battery pack has been removed. The track comprises a base portion of predetermined width and length, a first edge portion extending outwardly from the base portion and a second edge portion extending outwardly from the base portion with the second edge portion being positioned opposite the first edge portion. A first electrical connector is positioned at one end of the track with a second electrical connector being positioned at the opposite end of the track. Data interface circuitry is connected between the first electrical connector and the modem in the computer. The track is configured to slidably receive a cellular portable telephone available commerically from Motorola, Inc. In order to accommodate cellular portable telephones available commerically from NEC and OKI, a mounting bracket is disclosed which is structured to slidably connected the cellular portable telephones with the track.

15 Claims, 6 Drawing Sheets

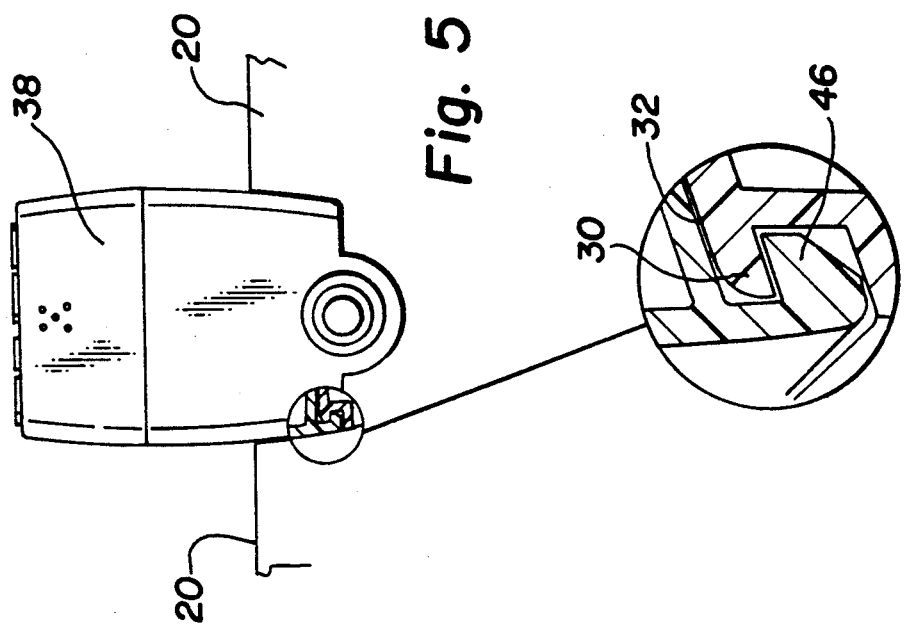
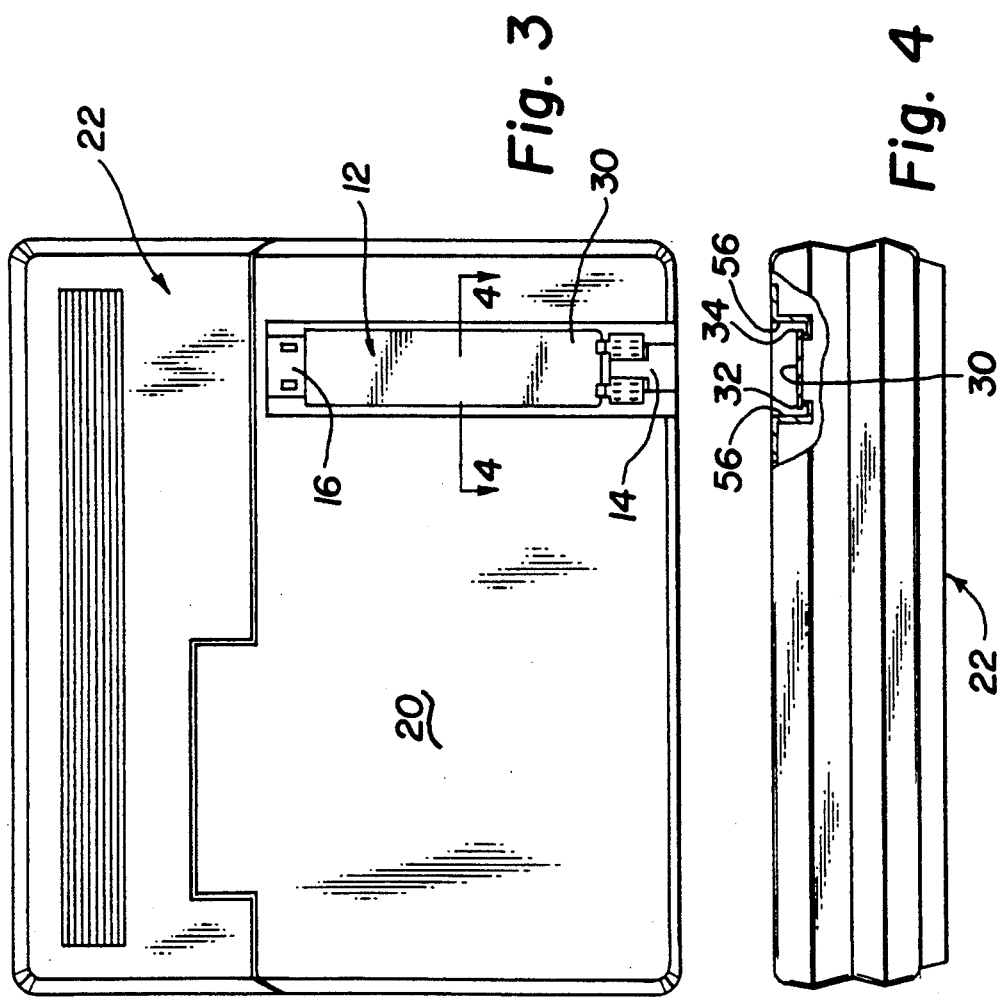

APPARATUS FOR REMOVABLY CONNECTING A CELLULAR PORTABLE TELEPHONE TO A COMPUTER

BACKGROUND OF THE INVENTION

1. Field of the Invention

The present invention relates in general to the transmission and reception of data and voice signals. More particularly, but not by way of limitation, it relates to apparatus for removably connecting a cellular portable telephone to a computer for transmitting and receiving data signals to and from the computer via the cellular portable telephone.

2. Description of the Prior Art

Although this invention is applicable to numerous and various types of computers, it has been found particularly useful in the environment of laptop or portable computers. Therefore, without limiting the applicability of the invention to "laptop and/or portable computers", the invention will be described in such environment.

In recent years, with the increased emphasis on and use of portable or laptop computers and the availability of the cellular telephone system, more and more people are finding the need for and the desirability of combining the portable or laptop computer with the cellular telephone system to not only send voice signals back and forth but to send digital data back and forth between remote sites.

Laptop or portable computers are now available which have a cellular telephone unit or system built inside (in a permanent type installation) the housing of the laptop or portable computers for use in sending data and voice signals over the cellular telephone system from and to remote locations where telephone lines are not available.

The present invention is intended to provide a solution to various prior art deficiencies which include the increased weight added to the computer by the built-in cellular telephone system and the added cost of having a built-in cellular telephone system in each computer.

SUMMARY OF THE INVENTION

The present invention provides apparatus for removably connecting a cellular portable telephone to a laptop or portable computer and comprises a track formed in the housing of the computer and is structured to slidably receive a cellular portable telephone whose battery pack has been removed. The track comprises a base portion of predetermined width and length and having a generally planar upper surface, a first edge portion extending outwardly from the base portion in a cantilever manner along the length of the base portion and a second edge portion extending outwardly from the base portion in a cantilever manner along the length of the base portion with the second edge portion being positioned opposite the first edge portion. A first electrical connector is positioned at one end of the track with a second electrical connector being positioned at the opposite end of the track. Data interface circuitry is connected between the first electrical connector and the modem in the computer. The track is generally T-shaped in cross section. The track is configured to slidably receive a cellular portable telephone available commerically from Motorola, Inc. In order to accomodate cellular portable telephones available commerically from NEC and OKI, a mounting bracket is disclosed which includes a first side which is structured to slidably connect with the track and includes a second side which is structured to receive the telephone from NEC and OKI. Interface circuitry is connected between the connectors on the track and connectors on the mounting bracket.

Among the advantages offered by the present invention are a reduction in cost of a computer with the capabiliy of transmitting data over the cellular telephone system. Only one cellular portable telephone needs to be purchased for a number of computers since the cellular portable telephone may be used on any of the computers incorporating the present invention. Each computer will have a reduction in weight since the cellular telephone will not be permanently installed in the computer. The computer may be used to transmit data over a cellular telephone system in the AMPS system, the European NORDIC and TACS systems.

Examples of the more important features and advantages of the invention have thus been summarized rather broadly in order that the following detailed description thereof may be better understood and in order that the contribution to the art may be better appreciated. There are, of course, additional features of the invention that will be described hereinafter and which will also form the subject of the claims appended hereto. Other features of the invention will become apparent with reference to the following detailed description of a presently preferred embodiment thereof in connection with the accompanying drawing, wherein like reference numerals have been applied to like elements in which:

BRIEF DESCRIPTION OF THE DRAWING

FIG. 3 is a top plan view of a computer incorporating the present invention;

FIG. 4 is a sectional view of a portion of the present invention in a computer taken along the line 4—4 of FIG. 3;

FIG. 5 is an end elevational view of a cellular portable telephone removably installed on the present invention in a computer;

FIG. 6 illustrates an enlarged view of a portion of FIG. 5;

DESCRIPTION OF THE PREFERRED EMBODIMENT

Figure 1:
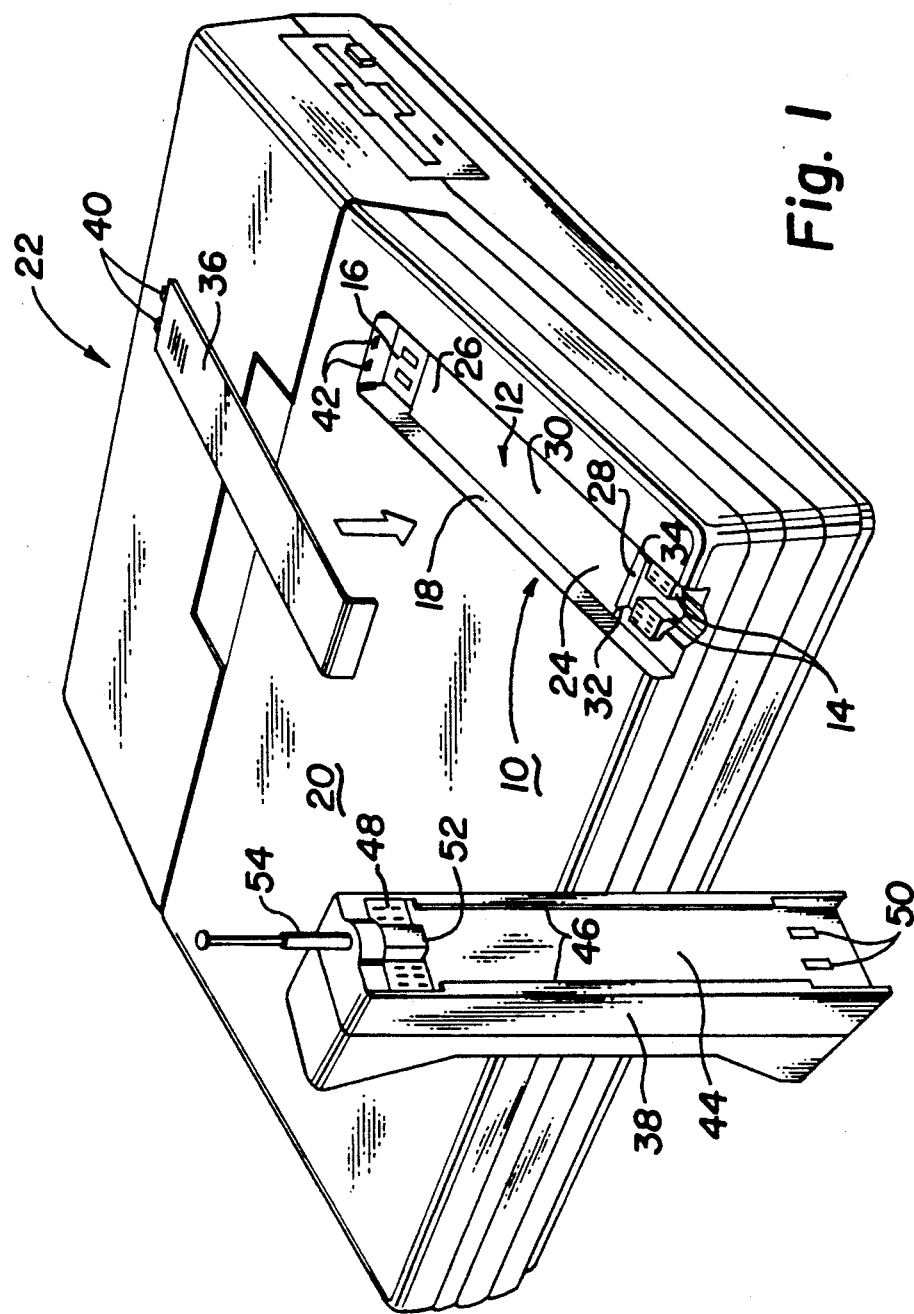
FIG. 1 is a front right perspective view of a computer incorporating the present invention.

Referring to the drawing and to FIG. 1 in particular, shown therein and generally designated by the reference numeral 10 is apparatus for removably connecting (or mounting track) a cellular portable telephone to a computer which is constructed in accordance with the present invention and comprises a track 12, a first electrical connector 14 and a second electrical connector 16. Apparatus for removably connecting a cellular portable telephone to a computer is positioned in an aperture or cavity 18 formed in the generally planar upper surface of housing 20 of computer 22. First electrical connector 14 is positioned at the end of the first end portion 24 of track 12. Second electrical connector 16 is positioned at the end of the second end portion 26 of track 12. Track 12 includes a base portion 28 of predetermined width and length and having a generally planar upper surface 30. Extending outwardly from the base portion 28 in a cantilever manner along the length of the base portion 28 is a first edge portion 32. Extending outwardly from the base portion 28 in a cantilever manner along the length of the base portion 28 and positioned opposite the first edge portion 32 is a second edge portion 34. Cover 36 is structured and dimensioned to fit into aperture or cavity 18, when a cellular portable telephone 38 is not removably mounted or connected to computer 22, such that the top surface of cover 36 is flush with housing 20. Tabs 40 on the end of cover 36 fit into openings 42 in housing 20.

Cellular portable telephone 38 is manufactured by and commercially available from Motorola, Inc. of Schaumberg, Illinois. Back surface 44 contains a track 46 which slidably mates and mounts onto track 12. Connector 48 mates with and operatively connects to first electrical connector 14 while connector 50 mates with and operatively connects to second electrical connector 16 when cellular portable telephone 38 is slidably mounted onto track 12. Back surface 44 of of cellular portable telephone 38 is offset from track 46 a sufficient distance to allow track 46 and track 12 to operatively engage and connect. Cellular portable telephone 38 is shown with the battery pack (not shown) removed. Cellular portable telephone 38 slidably connects or mounts to the battery pack (not shown) in a manner similar to the way in which it connects or mounts to apparatus for removably connecting 10 incorporated into computer 22. Cellular portable telephone 38 meets the AMPS (Advanced Mobile Phone Service) specifications determined by the Federal Communications Commission.

With further reference to FIG. 1, track 12, first edge portion 32 and second edge portion 34 are approximately 5.65 inches (approximately 143.5 mm) in length. First edge portion 32 and second edge portion 34 extend outwardly from base portion 28 at least approximately 0.04 inches (approximately 1 mm). The measurement between the outermost edges of first edge portion 32 and second edge portion 34 is approximately 1.4 inches (approximately 35.5 mm). It will be appreciated that a void is provided in the center area of first electrical connector 14 to accomodate a portion 52 of antenna 54.

Figure 2:
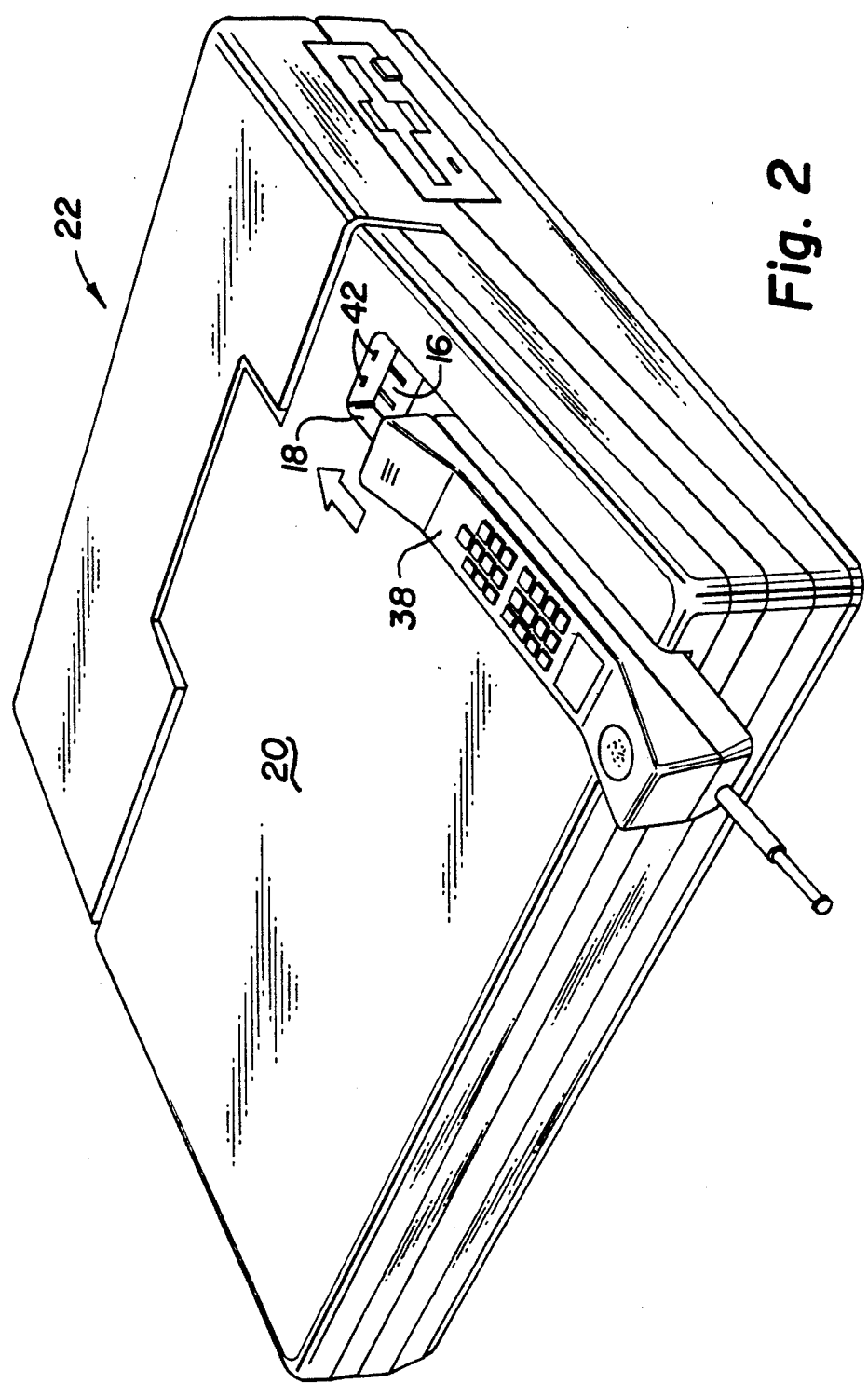
FIG. 2 is a front right perspective view of a computer incorporating the present invention with a cellular portable telephone partially installed.

With reference to FIG. 2, cellular portable telephone 38 (available from Motorola, Inc.) is shown being slidably mounted in the apparatus for removably connecting 10. It will be appreciated that to be fully mounted and in an operational position, cellular portable telephone 38 must be completely slid into aperture 18 to fill same and make operational connection of the mating connectors.

With reference to FIG. 3, apparatus for removably connecting 10 is more clearly shown as incorporated into computer 22.

With reference to FIG. 4, the section taken through track 12 more clearly shows the relationship between the first edge portion 32, the second edge portion 34, the generally planar upper surface 30 of base portion 28 and the sidewalls 56 of aperture or cavity 18 of the invention as incorporated into housing 20 of computer 22.

With reference to FIG. 5, an end view of cellular portable telephone 38, as installed in the apparatus for removably connecting 10 in an operational position, is shown.

Illustrated in FIG. 6 is an enlarged view of the relationship of track 12 and first edge portion 32 with track 46 of cellular portable telephone 38 when the cellular portable telephone 38 is operatively mounted to the apparatus for removably connecting 10. It will be appreciated that cellular portable telephone 38 can only be removed by sliding the cellular portable telephone 38 outwardly away from housing 20 of computer 22.

Figure 7:
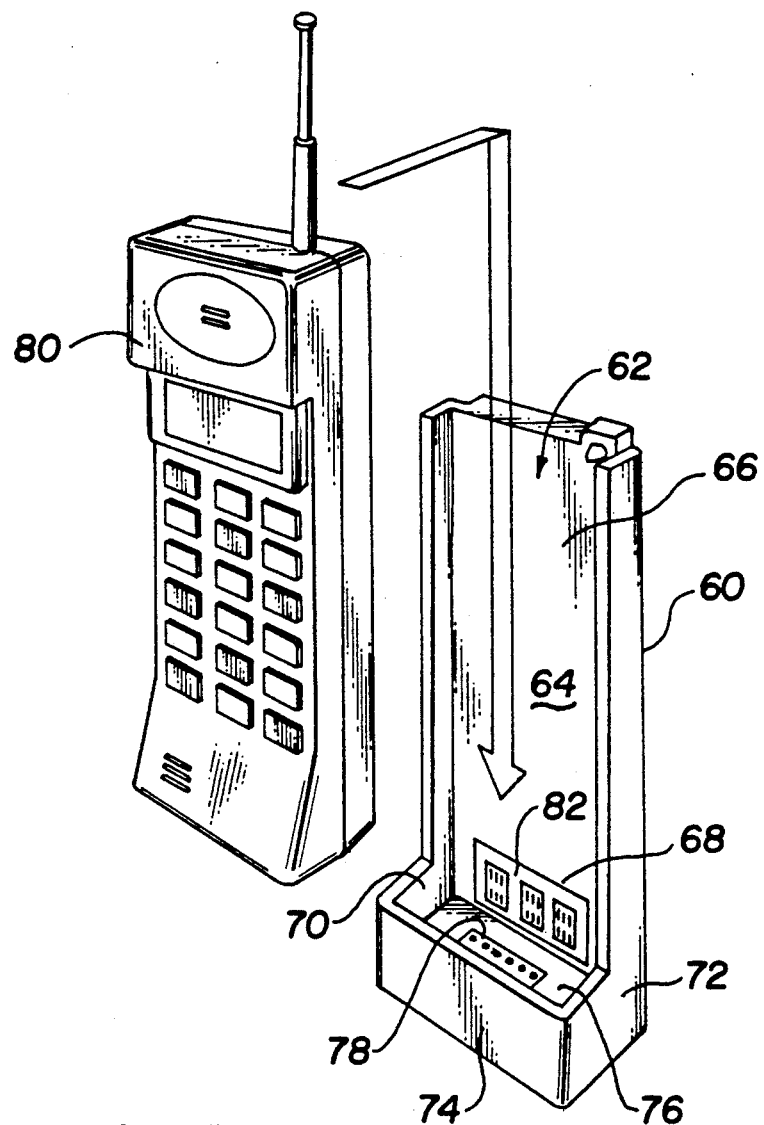
FIG. 7 is a front right side perspective view of the mounting bracket of the present invention and a cellular portable telephone.

Illustrated in FIG. 7 is mounting bracket 58 which when used with the apparatus for removably connecting 10 allows the use of cellular portable telephones for other systems (AMPS, European TACS and NORDIC systems) and other manufactures of cellular portable telephones (in addition to Motorola, Inc.) such as NEC and OKI. Motorola manufactures cellular portable telephones which operate on the AMPS, the European TACS and NORDIC systems and all of which will interface directly with the apparatus for removably connecting 10. Cellular portable telephones manufactured by NEC and OKI require an adapter in the form of mounting bracket 58 to interface and operatively connect with the apparatus for removably connecting 10.

Mounting bracket 58 comprises a first side 60 which is configured like the back of the cellular portable telephone 38 from Motorola, Inc. and will slidably connect and mount on the apparatus for removably connecting 10. Second side 62 is opposite first side 60 and includes back wall 64. Back wall 64 includes a top portion 66, a bottom portion 68, a first wall 70 and a second wall 72 positioned on opposing edges of back wall 64 and projecting therefrom at generally right angles. A front wall 74 is positioned at the bottom portion 68 and is connected between the first wall 70 and second wall 72. A floor portion 76 is connected between the back wall 64, the first wall 70 and the second wall 72. Third electrical connector 78 is mounted in floor portion 76 and is configured to interface and connect with the electrical connector on the bottom of the cellular portable telephone 80 available from NEC. Bottom portion 68 of back wall 64, first wall 70, second wall 72 and floor portion 76 cooperate to form a cavity or housing to hold and support cellular portable telephone 80.

In an additional embodiment of mounting bracket 58, a fourth electrical connector 82 is mounted in the bottom portion 68 of back wall 64 and is positioned and configured to interface and connect with the connector on the back of a cellular portable telephone available from OKI.

When a cellular portable telephone from either NEC or OKI is to be used with the apparatus for removably connecting 10, that particular cellular portable telephone is slipped into a mounting bracket 58 which is configured for that particular cellular portable telephone. Then that particular mounting bracket 58 is slidably mounted to the apparatus for removably connecting 10 (and track 12).

Figure 8:
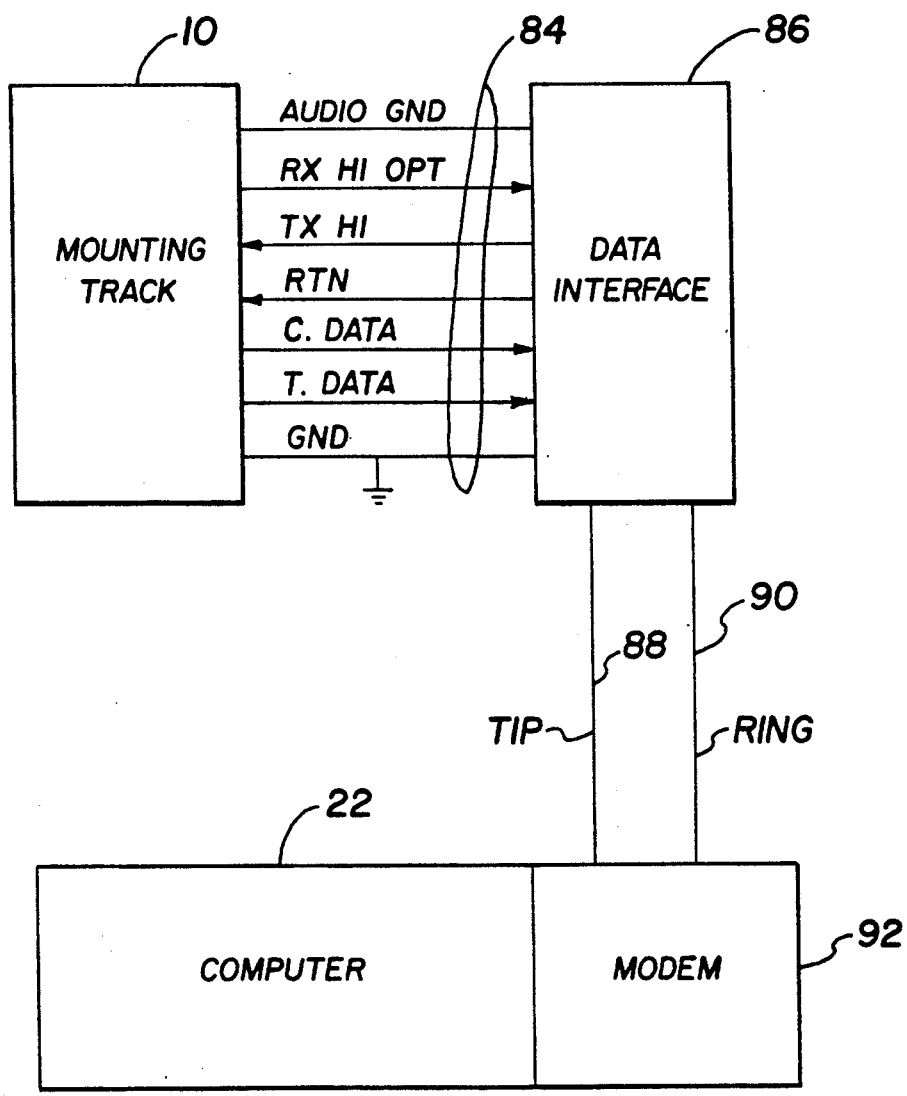
FIG. 8 is a simplified schematic of electrical connections of the present invention with a computer.

Illustrated in FIG. 8 are the electrical connection and conventional cellular signals routed between first electrical connector 14 of the apparatus for removably connecting (or mounting track) 10 and data interface 86 over cable leads 84. Data interfaces of this type are known, commercially available items, as exemplified by the interfaces sold by Motorola, Inc. The outputs of data interface 86 over leads 88 and 90 to modem 92 installed in computer 22 comprise the conventional signals on the tip and ring leads.

Figure 9:
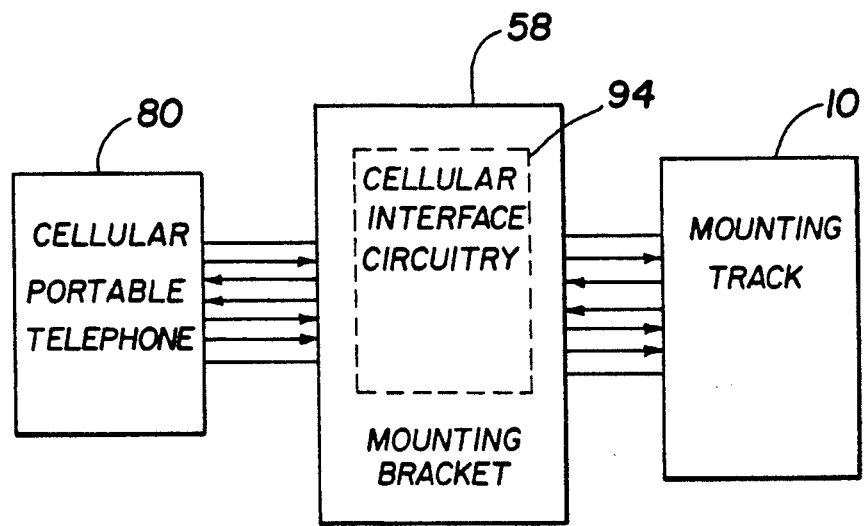
FIG. 9 is a simplified schematic of electrical connections of the present invention with a cellular portable telephone through the mounting bracket.

Illustrated in FIG. 9 are the electrical connection and conventional cellular signals routed between cellular portable telephone 80 and the apparatus for removably connecting (or mounting track) 10 through the cellular interface circuitry 94 which is physically mounted between the first side 60 and the second side 62 (see FIG. 7) of mounting bracket 58. Cellular interface circuitry 94 is operatively connected between the connector (which mates with first electrical connetor 14 - see FIG. 1) on the first side 60 of mounting bracket 58 and either the third electrical connector 78 in the configuration of the mounting bracket 58 for an NEC cellular portable telephone or the fourth electrical connector 82 in the configuration of the mounting bracket 58 for an OKI cellular portable telephone. Cellular interface circuitry 94 comprises conventional signal conditioning circuits and cross wiring between various pins of the connectors of mounting bracket 58 such that the proper signals will appear on the correct leads in cable leads 84 and the correct pins of third electrical connector 78 and fourth electrical connector 82.

Thus, it is apparent that there has been provided in accordance with this invention, apparatus that substantially incorporates the advantages set forth above and reduces the weight of the computer by allowing the weight of the cellular telephone to be removed from the computer until it is desired to send data over the cellular telephone system. The cost of providing the capability of sending data over the cellular telephone system has been reduced by eliminating the need to permanently install a cellular telephone in each computer. Using the present invention, a person may use the same computer in the U.S. and in Europe and transmit data over different cellular systems in each country. All that need be known is where the computer will be used and the correct cellular portable telephone can be supplied for use with the invention (including the correct mounting bracket) or all three type cellular phones may be supplied and used where the different cellular systems are found.

Although the present invention has been described herein with reference to specific forms thereof, it is evident that many alternatives, modifications and variations will become apparent to those skilled in the art in light of the foregoing disclosure. Accordingly, this description is to be construed as illustrative only and is for the purpose of teaching those skilled in the art the manner of carrying out the invention. It is to be understood that the forms of the invention herewith shown and described are to be taken as presently preferred embodiments. Various changes may be made in the shape, size and arrangement of parts. For example, equivalent elements may be substituted for those illustrated and described herein, parts may be reversed, and certain features of the invention may be utilized independently of other features of the invention. It will be appreciated that various modifications, alternatives, variations, etc., may be made without departing from the spirit and scope of the invention as defined by the appended claims.

What is claimed is:

1. Apparatus for removably connecting a cellular portable telephone to a computer having at least a housing, a generally planar surface in the housing, a power supply and a modem, said apparatus comprising:

a track formed in the generally planar surface of the housing and structured to slidably receive a cellular portable telephone whose battery pack has been removed, said track comprising:
  a base portion of predetermined width and length and having a generally planar upper surface, a first end portion and a second end portion;
  a first edge portion extending outwardly from said base portion in a cantilever manner along the length of said base portion;
  a second edge portion extending outwardly from said base portion in a cantilever manner along the length of said base portion, said second edge portion being positioned opposite said first edge portion;
a first electrical connector operatively positioned at the end of said first end portion;
a second electrical connector operatively positioned at the end of said second end portion and operatively connected to the power supply of the computer;
data interface circuitry operatively connected between said first electrical connector and the modem.

2. The apparatus of claim 1 wherein said track is generally T-shaped in cross section.

3. The apparatus of claim 1 further including an aperture of predetermined dimensions formed in the generally planar surface of the housing.

4. The apparatus of claim 3 wherein said track is positioned in said aperture.

5. The apparatus of claim 1 further including a mounting bracket having a first side structured to slidably connect with said apparatus for removably connecting and a second side structured to operatively receive the cellular portable telephone, wherein said second side includes a back wall having a top portion and a bottom portion, a first wall and a second wall projecting at generally right angles from said back wall, a front wall positioned at the bottom portion of said back wall and connected between said first wall and said second wall, a floor portion connected between said back wall, said first wall and said second wall and including a third electrical connector which operatively connects with said cellular portable telephone, and interface circuitry operatively connected between said third electrical connector and said first electrical connector.

6. The apparatus of claim 1 further including a mounting bracket having a first side structured to slidably connect with said apparatus for removably connecting and a second side structured to operatively receive the cellular portable telephone, wherein said second side includes a back wall having a top portion and a bottom portion, a first wall and a second wall projecting at generally right angles from said back wall, a front wall positioned at the bottom portion of said back wall and connected between said first wall and said second wall, a floor portion connected between said back wall, said first wall and said second wall and a fourth electrical connector positioned in said back wall which operatively connects with said cellular portable telephone.

7. The apparatus of claim 6 further including interface circuitry operatively connected between said fourth electrical connector and said first electrical connector.

8. In combination:

a computer having at least a housing, a generally planar surface in the housing, a power supply and a modem;

means for removably connecting a cellular portable telephone to said computer, comprising:

a track formed in the generally planar surface of the housing and structured to slidably receive a cellular portable telephone whose battery pack has been removed, said track comprising:

a base portion of predetermined width and length and having a generally planar upper surface, a first end portion and a second end portion;

a first edge portion extending outwardly from said base portion in a cantilever manner along the length of said base portion;

a second edge portion extending outwardly from said base portion in a cantilever manner along the length of said base portion, said second edge portion being positioned opposite said first edge portion;

a first electrical connector operatively positioned at the end of said first end portion;

a second electrical connector operatively positioned at the end of said second end portion and operatively connected to the power supply of the computer;

data interface circuitry operatively connected between said first electrical connector and the modem.

9. The combination of claim 8 wherein said track is generally T-shaped in cross section.

10. The combination of claim 8 further including an aperture of predetermined dimensions formed in the generally planar surface of the housing.

11. The combination of claim 10 wherein said track is positioned in said aperture.

12. The combination of claim 8 wherein said computer is a laptop computer.

13. The apparatus of claim 8 further including a mounting bracket having a first side structured to slidably connect with said apparatus for removably connecting and a second side structured to operatively receive the cellular portable telephone, wherein said second side includes a back wall having a top portion and a bottom portion, a first wall and a second wall projecting at generally right angles from said back wall, a front wall positioned at the bottom portion of said back wall and connected between said first wall and said second wall, a floor portion connected between said back wall, said first wall and said second wall and including a third electrical connector which operatively connects with said cellular portable telephone, and interface circuitry operatively connected between said third electrical connector and said first electrical connector.

14. The apparatus of claim 8 further including a mounting bracket having a first side structured to slidably connect with said apparatus for removably connecting and a second side structured to operatively receive the cellular portable telephone, wherein said second side includes a back wall having a top portion and a bottom portion, a first wall and a second wall projecting at generally right angles from said back wall, a front wall positioned at the bottom portion of said back wall and connected between said first wall and said second wall, a floor portion connected between said back wall, said first wall and said second wall and a fourth electrical connector positioned in said back wall which operatively connects with said cellular portable telephone.

15. The combination of claim 14 further including interface circuitry operatively connected between said fourth electrical connector and said first electrical connector.

* * * * *